United States Patent [19]
Twist et al.

[11] 3,808,022
[45] Apr. 30, 1974

[54] PIGMENTS

[75] Inventors: Walter Twist, Hartlepool; John Peacock, Sedgefield; David Malcolm Porter, Yarm, all of England

[73] Assignee: British Titan Limited, Billingham, Teeside, England

[22] Filed: Apr. 27, 1972

[21] Appl. No.: 247,976

[30] Foreign Application Priority Data
Apr. 28, 1971  Great Britain .................... 11821/71

[52] U.S. Cl. ........................... 106/300, 106/308 Q
[51] Int. Cl. ............................................... C09c 1/36
[58] Field of Search ........................ 106/300, 308 Q

[56] References Cited
UNITED STATES PATENTS

| | | | |
|---|---|---|---|
| 3,647,495 | 3/1972 | Cline .................................. | 106/300 |
| 3,453,130 | 7/1969 | Feld .................................. | 106/300 Q |
| 3,076,719 | 2/1963 | Whatley et al .................. | 106/300 Q |

*Primary Examiner*—Curtis R. Davis
*Attorney, Agent, or Firm*—Schuyler, Birch, Swindler, McKie & Beckett

[57] ABSTRACT

Pigmentary titanium dioxide coated with a propane diol in an amount of from 0.05 to 3 percent by weight. The particles can also be coated with one or more hydrous metal oxides.

20 Claims, No Drawings

PIGMENTS

This invention relates to titanium dioxide pigments and to a process for their production.

According to the present invention pigmentary titanium dioxide comprises particles of titanium dioxide coated with a propane diol in an amount of from 0.05 to 3 per cent by weight based on the weight of $TiO_2$.

The pigmentary titanium dioxide of the present invention can be coated with either propylene glycol i.e. 1,2 propane diol or trimethylene glycol i.e. 1,3 propane diol or with a mixture thereof. The coated products have improved dispersion particularly in paint when compared with similar pigments not coated with the diol.

The titanium dioxide can be either rutile or anatase titanium dioxide and as appropriate can be prepared by the well known sulphate or chloride processes.

The pigmentary titanium dioxide can also be coated, in addition to the propane diol, with one or more hydrous metal oxides or a phosphate. Typical hydrous metal oxides which can be present are those of aluminium, titanium, cerium, zirconium, zinc or silicon and pigmentary titanium dioxide coated with one or more of these oxides can be obtained by mixing with a aqueous slurry of the titanium dioxide a water-soluble compound of the desired metal and then changing the pH of the mixed slurry to precipitate the desired hydrous oxide. Such wet coating methods are well established. If desired, however, the titanium dioxide can be coated with an oxide of say aluminium, titanium, cerium, zirconium, zinc or of silicon in the vapour phase by a method wherein a gas stream containing titanium dioxide particles is mixed with an oxidisable compound of the desired metal and the compound is then oxidised at the appropriate temperature to deposit the oxide on the $TiO_2$ particles. Typical compounds that can be oxidised are the volatile halides, e.g. the chlorides of aluminium, titanium, cerium, zirconium, and silicon.

The metal oxide or phosphate can be present in widely varying amounts e.g. from 0.5 to 20 per cent but usually will be present in an amount of from 1 to 10 per cent by weight (expressed as the oxide) on the weight of $TiO_2$.

The propane diol is normally present in an amount of from 0.05 to 3 per cent by weight based on the weight of $TiO_2$. Preferably, however the amount of the propane diol is from 0.1 to 2 per cent of the weight of the $TiO_2$.

The propane diol can be applied to the pigment either in an aqueous or organic solution followed by removal of the solvent or can be applied during milling of the pigment in a fluid energy mill.

When the propane diol is to be applied in solution it is usual to add an aqueous solution of the propane diol to an aqueous slurry of the pigment, normally after any other desired metal oxide or phosphate has been applied. The mixed solution of propane diol and slurry are stirred for any desired period, to achieve adequate contact between the pigment particles and the propane diol. After mixing the pigment is filtered and dried. Alternatively, the slurry can be dried without filtering.

The concentration of the propane diol in the slurry will usually be somewhat greater than that desired on the pigment surface and typical concentrations of the diol in the mixed slurry are from 1.5 to 30 grams per 1,000 grams of $TiO_2$.

Generally the concentration of titanium dioxide in the slurry will be from 150 to 300 grams $TiO_2$ per litre.

Preferably the propane diol is applied to the pigment when the pigment is subjected to fluid energy milling in which e.g. steam is employed as the milling medium to produce the desired milling of the particles. The propane diol can be added directly with the steam or separately introduced in to the mill and deposited on the pigment particles.

The titanium dioxide of the present invention can be used in a wide variety of uses such as in oleoresinous paints, aqueous emulsion paints, plastics, paper making and others.

The invention is illustrated in the following Examples.

EXAMPLE 1

1,000 grams of a fluid energy milled rutile titanium dioxide pigment having a coating of 1.0 per cent hydrous $TiO_2$ and 3.0 per cent hydrous $Al_2O_3$ each expressed as the oxide on the $TiO_2$ of the pigment were mixed thoroughly with 1,000 grams of 1% w/w aqueous solution of 1, 2 propane diol. The slurry was filtered and the product dried at 150°C. Finally the treated pigment so obtained was crushed and fluid energy milled using air as the medium. The pigment contained the 1,2 propane diol in an amount of 0.36% w/w.

The case of dispersion of the treated pigment was determined by ball-milling the pigment in an alkyd resin mill-base and removing samples at specified times for testing by means of a Hegman gauge. A sample of the same rutile titanium dioxide pigment without treatment with 1,2 propane diol was tested in the same way.

The mill-base formulation was as follows:

|  | Grams |
| --- | --- |
| P470 Alkyd resin (70% solution in white spirit supplied by Beck-Koller | 13 |
| High Flash White Spirit | 20 |
| Pigment under test | 45 |
| Ballotini (small glass spheres for milling) | 120 |

The jar in which the ball-milling was effected was a 0.375 pint glass jar and it was rotated at 77 rev. per min.

The ball-milling time and Hegman gauge readings are shown in the following table.

| | HEGMAN GAUGE READING | |
| --- | --- | --- |
| Time Hours | Treated Pigment | Untreated Pigment |
| 0.5 | 7½ – 4½ | 7 – <1 |
| 1 | 7¾ – 4¾ | 7 – 4 |
| 2 | 7¾ – 5½ | 7¼ – 5 |
| 3 | O/S – 5½ | 7¼ – 5 |
| 4 | O/S – 6½ | 7¼ – 5½ |

O/S = off scale

The first value of any result gives the position on the scale where the surface of the composition is almost wholly composed of grits and the second value gives the position on the scale where grits first appear. The higher the reading the easier is the pigment to disperse for a given milling time.

As can be seen from the above table the treated pigment was markedly superior to the untreated pigment.

EXAMPLE 2

The procedure of Example 1 was repeated but the 1,2 propane diol was replaced by 1,3 propane diol. The final pigment had a diol content of 0.34% w/w.

The results of the dispersibility tests are given in the following table.

| Time Hours | HEGMAN GAUGE READING | |
|---|---|---|
| | Treated Pigment | Untreated Pigment |
| 0.5 | 6¾ – 4¾ | 7 – 1 |
| 1 | 7¼ – 4¾ | 7 – 4 |
| 2 | 7¼ – 5½ | 7¼ – 5 |
| 3 | O/S – 6 | 7¼ – 5 |
| 4 | O/S – 6¼ | 7¼ – 5½ |

Again the improvements obtained by treating the pigment with the diol are clearly demonstrated.

EXAMPLE 3

A non-fluid energy milled rutile titanium dioxide pigment having a coating similar to that described in Example 1 was fluid energy milled with steam and with 1,2 propane diol or 1,3 propane diol to produce pigments containing 0.5 percent and 1% w/w of the particular diol. A untreated control was prepared. In each case the milling conditions were as follows:

| | |
|---|---|
| Steam pressure | 80 p.s.i.g. |
| Steam rate | 620 lbs/hr. |
| Pigment feed rate | 400 lbs/hr. |
| Steam pigment ratio | 1.55:1 |

The pigments were tested for their ease of dispersibility using a mill-base of the following composition:

| | |
|---|---|
| Alkyd resin solution (40%) P470 | 90 grams |
| Pigment | 248 grams | and milling in a high speed mixer for 5½ minutes, adding a further 30 grams of the resin solution and milling for a further one-half minute.

The results are given below.

Hegman Gauge Reading

| 1,2 propane diol | | 1,3 propane diol | | Control |
|---|---|---|---|---|
| 0.05% | 1% | 0.5% | 1% | |
| 7½ – 5½ | 7½ – 6 | 7½ – 5 | 7½ – 5½ | 7 – 5 |

What is claimed is

1. Pigmentary titanium dioxide which comprises particles of titanium dioxide coated with a propane diol selected from the group consisting of 1, 2 propane diol, 1, 3 propane diol, and mixtures of 1, 2 propane diol and 1, 3 propane diol, in an amount of from 0.05 to 3 per cent by weight based on the weight of $TiO_2$.

2. Pigmentary titanium dioxide according to claim 1 in which the propane diol is 1, 2 propane diol.

3. Pigmentary titanium dioxide according to claim 1 in which the propane diol is 1, 3 propane diol.

4. Pigmentary titanium dioxide according to claim 1 in which the diol is present in an amount of from 0.1 to 2 per cent by weight of the $TiO_2$.

5. Pigmentary titanium dioxide according to claim 1 in which the particles of titanium dioxide are coated with one or more metal oxides and/or a phosphate.

6. Pigmentary titanium dioxide according to claim 5 in which the metal oxide is a hydrous oxide of aluminium, titanium, cerium, zirconium, zinc or silicon.

7. Pigmentary titanium dioxide according to claim 5 in which the metal oxide is a non-hydrous oxide of aluminium, titanium, cerium, zirconium, zinc or silicon.

8. Pigmentary titanium dioxide according to claim 5 in which the metal oxide and/or a phosphate is present in an amount of from 0.5 to 20 per cent by weight based on the weight of $TiO_2$.

9. Pigmentary titanium dioxide according to claim 8 in which the metal oxide and/or a phosphate is present in an amount of from 1 to 10 per cent by weight of $TiO_2$.

10. Pigmentary titanium dioxide according to claim 1 in which the titanium dioxide is rutile titanium dioxide.

11. A method for the manufacture of pigmentary titanium dioxide of improved dispersion comprising mixing the titanium dioxide to be treated with a propane diol selected from the group consisting of 1, 2 propane diol, 1, 3 propane diol, and mixtures of 1, 2 propane diol and 1, 3 propane diol in an amount of from 0.05 to 3 per cent based on the weight of $TiO_2$.

12. A method according to claim 11 in which the titanium dioxide is in the form of an aqueous dispersion and said dispersion is mixed with an aqueous solution of said propane diol.

13. A method according to claim 12 in which the concentration of the titanium dioxide in the aqueous dispersion is from 150 to 300 grams $TiO_2$ per litre of dispersion.

14. A method according to claim 12 in which the concentration of the propane diol in the mixed dispersion is from 1.5 to 30 grams per 1,000 grams of $TiO_2$.

15. A method according to claim 11 in which the titanium dioxide is milled in a fluid energy mill by a milling medium and the propane diol is added to the mill.

16. A method according to claim 15 in which the milling medium is steam.

17. A method according to claim 15 in which the propane diol is added to the fluid energy mill together with the milling medium.

18. A method according to claim 15 in which the propane diol is added to the fluid energy mill separately to but simultaneously with the milling medium.

19. A method according to any one of claims 11 in which the titanium dioxide is coated with one or more metal oxides and/or a phosphate prior to treatment with the propane diol.

20. A method according to claim 19 in which the metal oxide is a hydrous metal oxide of aluminium, titanium, cerium, zirconium, zinc or silicon.

* * * * *